United States Patent

Wienberg

[11] Patent Number: 5,901,919
[45] Date of Patent: May 11, 1999

[54] ADHESIVE TAPE AND METHOD OF USING IT

[75] Inventor: Uwe Wienberg, Uetersen, Germany

[73] Assignee: Beiersdorf AG, Hamburg, Germany

[21] Appl. No.: 08/889,376

[22] Filed: Jul. 8, 1997

[30] Foreign Application Priority Data

Jul. 13, 1996 [DE] Germany ............... 196 28 317

[51] Int. Cl.$^6$ ............... B65H 19/18; B32B 7/06
[52] U.S. Cl. ............... 242/556.1; 428/40.1; 428/42.2; 428/350; 428/354
[58] Field of Search ............... 428/40.1, 42.2, 428/350, 354; 242/556.1

[56] References Cited

U.S. PATENT DOCUMENTS 5,692,699  12/1997  Weirauch et al. ............... 242/556.1

*Primary Examiner*—Alexander Thomas
*Attorney, Agent, or Firm*—Sprung Kramer Schaefer & Briscoe

[57] ABSTRACT

Adhesive tape for flying reel change in paper finishing machines or the like, having a paper backing and a water-soluble self-adhesive composition, characterized in that the paper backing (2) is coated on one side with a water-soluble self-adhesive composition (3) while part of the reverse side of the paper backing (2) is provided with a double-sided adhesive tape (6), which in turn has a readily splicing paper backing (7) which is provided on both sides with water-soluble self-adhesive composition (8 and 9 respectively).

9 Claims, 1 Drawing Sheet

ADHESIVE TAPE AND METHOD OF USING IT

BACKGROUND OF THE INVENTION

1. Field of the Invention

The invention relates to an adhesive tape for flying reel change in paper finishing machines or the like, and to a method of using it in such machines.

2. Description of Related Art

Flying reel change in papermaking factories or the like is a common technique of replacing an almost fully discharged reel of paper by a new reel without the need to stop the machines, which run at high speed. This is done using double-sided self-adhesive tapes, known as splicing tapes, which firstly are of high adhesion and high tack but secondly, because of their water-soluble self-adhesive compositions and paper backing, do not interfere with the re-use of paper wastes in the paper-making machine. These splicing tapes are bonded artistically in a zig-zag form to the beginning of the web, a procedure requiring experienced personnel, with only about 4–5 minutes remaining for the entire procedure owing to the high speed of the machines.

Although this technology is well established, it is not without certain disadvantages. Thus experienced personnel are required, the procedure is automatically hectic, and the bonds are also relatively thick, since in each case two layers of paper and the adhesive splice in between are the result: a result which is unwanted in the paper industry.

There are various products on the market, known as splicing tapes, for this splicing operation in the course of flying reel change, which comprise in addition to a paper backing a water-soluble self-adhesive composition coated on both sides. Adhesive tapes of this kind are marketed inter alia under the name tesafix (Beiersdorf).

SUMMARY OF THE INVENTION

The object of the invention was to remedy this situation and, in particular, to facilitate a thinner bond in flying reel change while at the same time allowing this reel change to be carried out with more time, and also more processing time, yet while retaining the advantages achieved to date.

This object is achieved as set out in more detail in the claims.

The invention relates in particular to an adhesive tape for flying reel change in paper finishing machines or the like, having a paper backing and a water-soluble self-adhesive composition, characterized in that the paper backing (2) is coated on one side with a water-soluble self-adhesive composition (3) while part of the reverse side of the paper backing (2) is provided with a double-sided adhesive tape (6), which in turn has a readily splicing paper backing (7) which is provided on both sides with water-soluble self-adhesive composition (8 and 9 respectively).

Preference is given in this context to an adhesive tape where the self-adhesive compositions (3 and 9) have a cover (4 and 10).

Preference is given, furthermore, to an adhesive tape where the cover (3) provided on the front side has a slit (5).

Preference is additionally given to an adhesive tape where the adhesive tape (1) is from 120 to 150 mm in width while the adhesive tape (6) provided on the reverse side is 8–20 mm, in particular 10–15 mm, in width.

Preference is also given to an adhesive tape where the slit (5) is provided at a distance of 20–40 mm from the edge of the adhesive tape (1) which lies opposite the adhesive tape (6) provided on the reverse side.

Preference is given, furthermore, to an adhesive tape where the adhesive tape (6) on the reverse side of the paper backing (2) is disposed such that it ends laterally with one side of the paper backing (2).

The invention also relates to a method using adhesive tapes of this kind, namely a method of flying reel change in a paper finishing machine or the like, where an adhesive tape having a paper backing and a water-soluble self-adhesive composition is used, characterized in that an adhesive tape according to one of claims 1–6 is employed and bonds the back of part of the topmost web of a new reel of paper, while the double-sided adhesive tape located on the reverse side of the adhesive tape in turn bonds the underneath web of paper and thus secures the topmost web of paper, whereupon the new reel of paper is placed adjacent to an almost fully unwound reel of paper that is to be replaced and is accelerated to the same speed as the old reel, and then is pressed against it so that the exposed self-adhesive composition of the adhesive tape bonds with the paper web of the old reel when the webs of paper are at essentially the same speeds, while at the same time the readily splicing paper backing splices in such a way that the two self-adhesive compositions with which it was coated are covered non-adhesively by the remains of said spliced paper backing.

In the context of this method it is preferred that first of all only the smaller part of the slitted cover is peeled off and the adhesive tape is bonded to the exposed part of the self-adhesive composition behind the topmost web of a new reel of paper, while the larger part of the cover is not peeled off until shortly before its use for flying reel change.

In accordance with the invention, the paper industry is offered the possibility of departing from the technique of end bonding used to date without giving up the advantages of that technique.

Indeed, on both technical and rationalization grounds, it is desirable to depart from the known technique of end bonding with double-sided reprocessable adhesive (splicing) tape in the course of automatic reel change on coating units. It is now possible to switch to a single-sided, reprocessable adhesive tape, with considerable advantages.

In this new bonding technology with an adhesive tape according to the invention, an advantageous procedure is to bond the underside of the topmost layer of paper (untreated paper) with a single-sided, covered, reprocessable adhesive tape about 120 mm in width (diagonally to the machine direction). The extent of underside bonding should be about 30 mm. Before this bonding, the covering paper, slitted or perforated to 30 mm, is peeled off. After the release paper has been peeled off about 90 mm still remains for the actual splicing operation.

The single-sided adhesive tape with the open adhesive-tape side outwards is now available for actual splicing, if any cover present is removed.

When accelerating the paper unwind it is necessary to hold the start of the paper (bonding site) fast with the aid of a double-sided adhesive tape (reprocessable). Particularly suitable in this context is a tesafix equipped with a readily splicing paper backing.

The single-sided adhesive splicing tape is then fastened to the next layer of paper with the aid of this double-sided adhesive, readily splicing tesafix.

In order to prevent the penetration of air when accelerating the paper unwind (currently to about 1600 m/min.) it is advantageous to bond a strip of about 12 mm crosswise over the entire paper web.

The advantages achieved in accordance with the invention lie, in particular, in the facts that the bond site is substantially thinner than previously (resulting in fewer paper breaks) and that there is less machine downtime (increase in efficiency), since a break costs up to DM 30,000. Also, the thickness of the bond site is advantageously low: currently 2 paper layers plus tesafix adhesive tape (adhesive tape thickness 0.085 mm), but according to the invention only 1 paper layer plus tesakrepp (adhesive tape thickness 0.088 mm). Finally, the bond site can be prepared outside the coating unit (rewinder). This results in a saving of personnel on the coating unit and then more time for implementing the bond site on the rewinder.

BRIEF DESCRIPTION OF THE DRAWINGS

In the text below the intention is to describe the invention in more detail with reference to an exemplary embodiment without wishing thereby to restrict it unnecessarily. In the drawings.

DETAILED DESCRIPTION OF A PREFERRED EMBODIMENT

Figure 1:
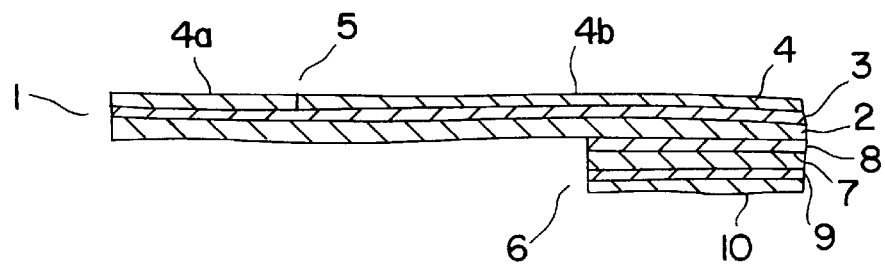
FIG. 1 shows a lateral, schematic view of an adhesive tape according to the invention.

In detail, FIG. 1 shows an adhesive tape 1 having a backing 2 made of crepe paper, coated on one side with a water-soluble self-adhesive composition 3. The overall thickness of the backing 2 plus self-adhesive composition 3 is 0.088 mm, its width is 150 mm, and it is marketed as tesakrepp 4447 PV 1, Beiersdorf, Germany. The self-adhesive composition 3 is covered with a siliconized release paper 4 which is provided at a distance of 30 mm from its left-hand edge with a slit 5, so that the left-hand part of the release paper 4 can be removed first and then the right-hand part. At the right-hand end of the adhesive tape 1 a double-sided adhesive tape 6 is bonded underneath, consisting of a readily splicing paper backing 7 coated on both sides with water-soluble self-adhesive composition 8 and 9, respectively, and covered with a siliconized release paper 10. The adhesive tape 6 has a width of 12 mm and is marketed under the designation tesafix 4901 PV 10 (Beiersdorf, Austria).

Figure 2:
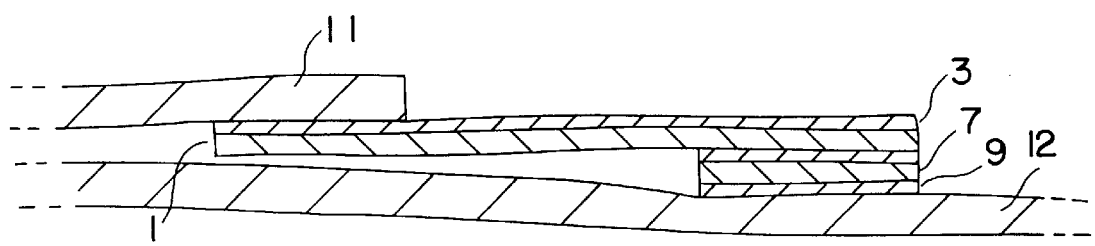
FIG. 2 shows a lateral, schematic view of an adhesive tape according to FIG. 1, bonded to a reel of paper and ready for a flying reel change.

FIG. 2 shows how such an adhesive tape 1 is bonded behind a paper web 11, namely by the left-hand part, the part 4a of the release paper having been peeled off from this part. The release paper 10 has also been peeled off from the underside of the adhesive tape 6 bonded underneath, and the thus exposed self-adhesive composition 9 bonds to the paper web 12 of a reel of paper lying below the paper web 11. The right-hand part 4b of the release paper 4 has also been peeled off, so that the paper reel thus equipped is ready for a flying reel change, the bond of the adhesive tape 1 extending obliquely over the reel in order to avoid a jerk at the moment of the flying reel change.

The self-adhesive composition 3 is now exposed and is ready for this flying change, in a width of 120 mm and over the entire width of the reel of paper.

Figure 3:
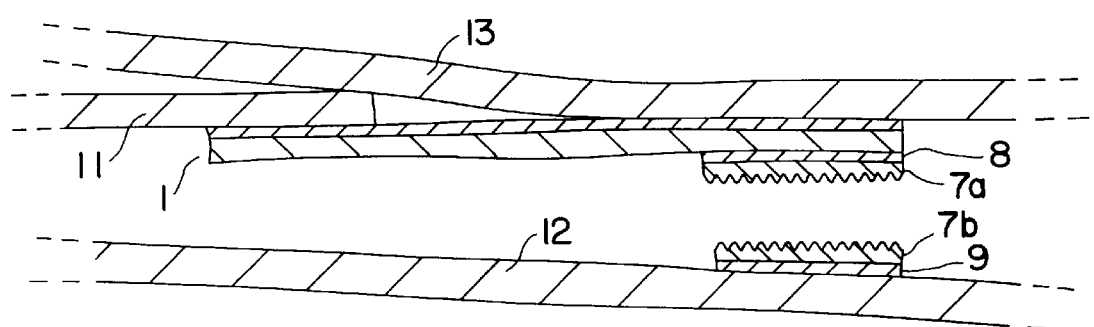
FIG. 3 shows a view according to FIG. 2 but after flying reel change has taken place.

The (new) reel of paper thus equipped is placed adjacent to the unwound (old) reel of paper to which the new reel is to be attached and is accelerated to the same rotary speed as the said old reel. When this has been done, the change can be executed: the new reel is brought up against the old one, the self-adhesive composition 3 bonds, in accordance with FIG. 3, to the paper web 13 of the old reel, while the readily splicing paper backing 7 splices in such a way that one part 7a remains on the adhesive tape 1, where it covers the self-adhesive composition 8, while the other part 7b remains on the self-adhesive composition 9, which bonds to the paper web 12. Thus both self-adhesive compositions, 8 and 9, are to a certain extent neutralized, no longer adhere, and thus do not disrupt the subsequent process in the paper machines.

I claim:

1. An adhesive tape for use in making flying paper reel changes, said adhesive tape comprising:
    a) a first paper backing (2);
    b) a first adhesive layer (3) comprising a water-soluble self-adhesive composition coated on a first side of said first paper backing;
    c) a second adhesive layer (8) comprising a water-soluble self-adhesive composition coated on part of a second side of said first paper backing;
    d) a second paper backing (7) adhered on a first side of said second paper backing to said second adhesive layer; and
    e) a third adhesive layer (9) comprising a water-soluble self-adhesive composition coated on a second side of said second paper backing;

wherein said second paper backing, when said adhesive tape is adhered between a new paper reel and an old paper reel to be replaced by said new paper reel, both of which are in motion, will cleave in two portions between said second and third adhesive layers such that a first portion of said cleaved second paper backing will continue to adhere to and cover said second adhesive layer and a second portion of said cleaved second paper backing will continue to adhere to and cover said third adhesive layer.

2. An adhesive tape according to claim 1, wherein said first adhesive layer (3) is provided with a cover (4) and said third adhesive layer (9) is provided with a cover (10).

3. An adhesive tape according to claim 2, wherein cover (4) has a slit (5).

4. An adhesive tape according to claim 1, wherein said first paper backing is from 120 to 150 mm in width and said second paper backing is from 8 to 20 mm in width.

5. An adhesive tape according to claim 4, wherein said second paper backing is from 10 to 15 mm in width.

6. An adhesive tape according to claim 1, wherein said first and second paper backings are spatially positioned such that an edge of said second paper backing is flush with a first edge of said first paper backing.

7. An adhesive tape according to claim 6, wherein said first adhesive layer (3) is provided with a cover (4), said cover has a slit (5), and said slit is provided in said cover at a distance of from 20 to 40 mm measured from an edge of said first paper backing opposite said first edge.

8. A method of making a flying paper reel change comprising:
    a) providing an adhesive tape according to any one of claims 1–7;
    b) adhering a portion said first adhesive layer to an underside of a topmost web of a new reel of paper;
    c) adhering said third adhesive layer to a web of paper underneath said topmost web;
    d) accelerating the new reel of paper to the speed of an old reel of paper, which is already in motion and is to be replaced by said new reel of paper;

e) adhering another portion of said first adhesive layer to an underside of a web of said old reel of paper and cutting said old reel of paper to create a splice bond between said old reel of paper and said new reel of paper, thereby effecting a flying paper reel change;

wherein said second paper backing of said adhesive tape, when adhered between said new paper reel and said old paper reel, will cleave in two portions between said second and third adhesive layers such that a first portion of said cleaved second paper backing will continue to adhere to and cover said second adhesive layer and a second portion of said cleaved second paper backing will continue to adhere to and cover said third adhesive layer.

9. A method according to claim 8, wherein said first adhesive layer (3) is provided with a cover (4), said cover has a slit (5), and said slit divides said cover into a first covering layer portion and a second covering layer portion, said first covering layer portion is removed to expose a portion of said first adhesive layer, and said exposed portion is adhered to the underside of said topmost web of the new reel of paper, and said second covering layer portion is removed at another time shortly before bonding of the new reel of paper to said old reel of paper, and the act of removing the second cover portion exposes another portion of said first adhesive layer, which is bonded to the underside of said web of said old reel of paper to create the splice bond between said new reel of paper and said old reel of paper.

\* \* \* \* \*

UNITED STATES PATENT AND TRADEMARK OFFICE
CERTIFICATE OF CORRECTION

PATENT NO. : 5,901,919
DATED : May 11, 1999
INVENTOR(S) : Uwe Wienberg

It is certified that error appears in the above-identified patent and that said Letters Patent is hereby corrected as shown below:

Item [56]
Title Page, References Cited

After "242/556.1" and before "primary examiner" insert --FOREIGN PATENT DOCUMENTS
555,772  8/1993  European
683,122  11/1995  European
695,709  2/1996  European --

Signed and Sealed this

Thirtieth Day of November, 1999

Attest:

Attesting Officer

Q. TODD DICKINSON

Acting Commissioner of Patents and Trademarks